INVENTORS
THOMAS A.S. DUFF
RALPH D. WAITE
BY Smythe & Moore
ATTORNEYS

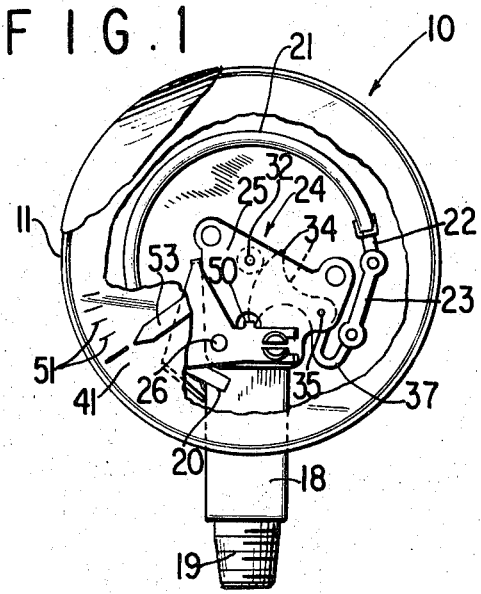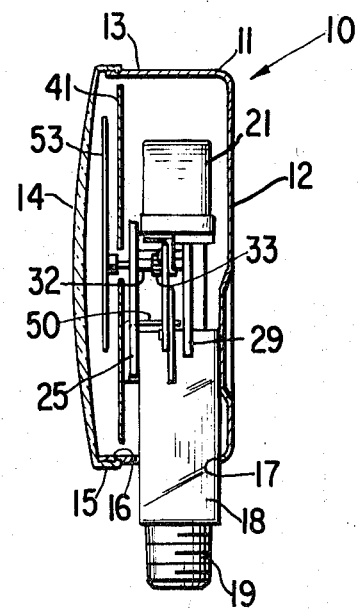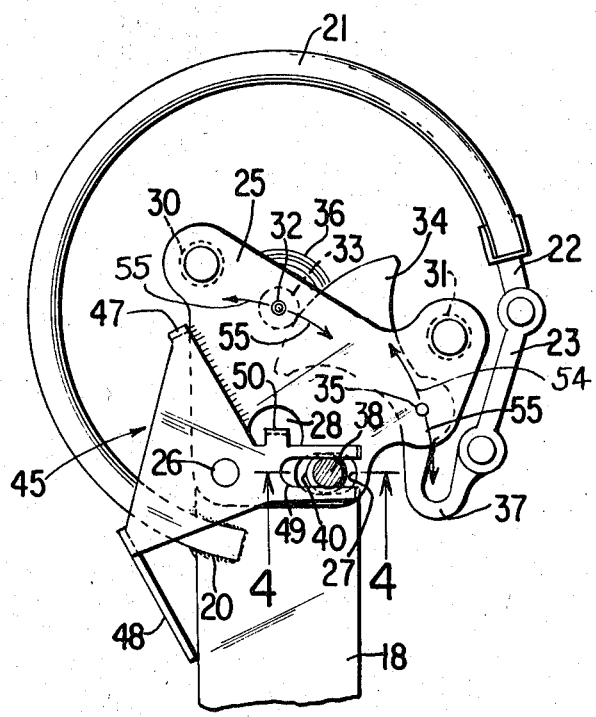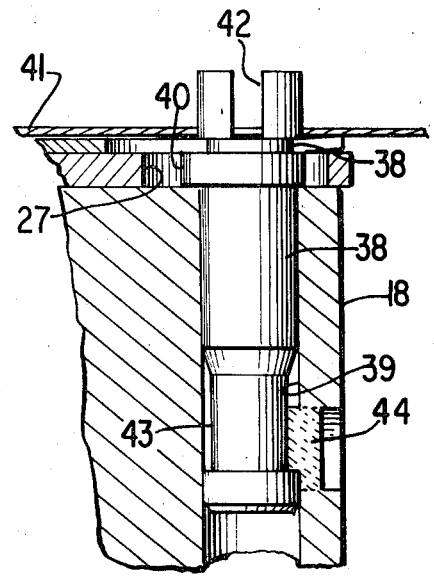

United States Patent Office 3,559,489
Patented Feb. 2, 1971

3,559,489
BAR STOCK ZERO ADJUSTMENT WITH STOP
Thomas A. S. Duff, Chalfont, and Ralph D. Waite, Sellersville, Pa., assignors to Amtek, Inc., New York, N.Y., a corporation of Delaware
Filed June 2, 1969, Ser. No. 829,259
Int. Cl. G01l 7/04
U.S. Cl. 73—415
8 Claims

ABSTRACT OF THE DISCLOSURE

A Bourdon tube pressure gauge has its instrument movement mounted between a bottom and top plate with the latter being pivotally mounted on the socket of the gauge at a point spaced from the pointer axis. The top plate is provided with a slot extending radially from the pivotal connection. A pin is pivotally mounted in a bore in the socket and is provided with an eccentric which moves within the top plate slot so that actuation of the pin externally of the socket will adjust the movement while the free end of the Bourdon tube remains stationary.

---

Instruments wherein an indicator pointer moves over a scale on a dial face are usually provided with a mechanism for adjusting the position of the pointer. The mechanism may be used for calibrating the instrument by adjusting the pointer to zero or some other known point so that an accurate indication may be obtained. Such a "zero adjustment" is particularly desirable on Bourdon-type pressure gauges since, after periods of use, the indicator pointer may no longer indicate zero even though only atmospheric pressure is acting upon the gauge. It is also desirable to provide a simplified and effective structure for quickly adjusting the pointer to zero after the instrument has been assembled and preparatory to being placed in use.

While many forms of zero adjustment mechanisms for pressure gauges have been proposed, many are complicated in structure and cannot be readily actuated without disassembly of the instrument, or are expensive to manufacture.

One of the objects of the present invention is to provide an improved zero adjustment structure for a Bourdon-type pressure gauge.

Another of the objects of the present invention is to provide a zero adjustment which can be actuated from the dial face of the instrument.

Another of the objects of the invention is to provide a simplified and effective low cost structure for quickly adjusting the pointer of a pressure gauge to zero.

According to one aspect of the invention, an instrument internal assembly for a pressure gauge may comprise a socket for connection to a pressure source. A Bourdon tube has one end mounted on the socket for communication with the interior thereof and the other end is free. The top plate of an instrument movement including a pointer and pointer shaft is pivotally mounted on the socket. Link means are provided to interconnect the movement with the free end of the Bourdon tube so that the movement is actuated in response to pressure sensed by the Bourdon tube. Means are provided on the socket actuable externally thereof to rotate the top plate and the movement therewith about the pivot connection while the free end of the Bourdon tube remains stationary so that the pointer shaft may be rotated through a small angle in order to calibrate the gauge.

The top plate may be provided with a slot which extends radially from the pivot connection. A pin is rotatably mounted in the socket, and an eccentric is provided on the pin for movement within the top plate slot so that rotation of the pin will rotate the top plate together with the other movement components.

Other objects, advantages and features of the present invention will be apparent from the accompanying description and drawings, which are merely exemplary.

In the drawings:

FIG. 1 is a front elevational view of an instrument casing assembly according to the present invention with portions of the dial face and cover plate being cut away;

FIG. 2 is a sectional view taken along the line 2—2 of FIG. 1;

FIG. 3 is a front elevational view of the internal structure of the gauge of FIG. 1 but in enlarged scale;

FIG. 4 is an enlarged sectional view taken along the line 4—4 of FIG. 3;

Proceeding next to the drawings wherein like reference symbols indicate the same parts throughout the various views, a specific embodiment of the present invention will be described in detail.

Figure 5:
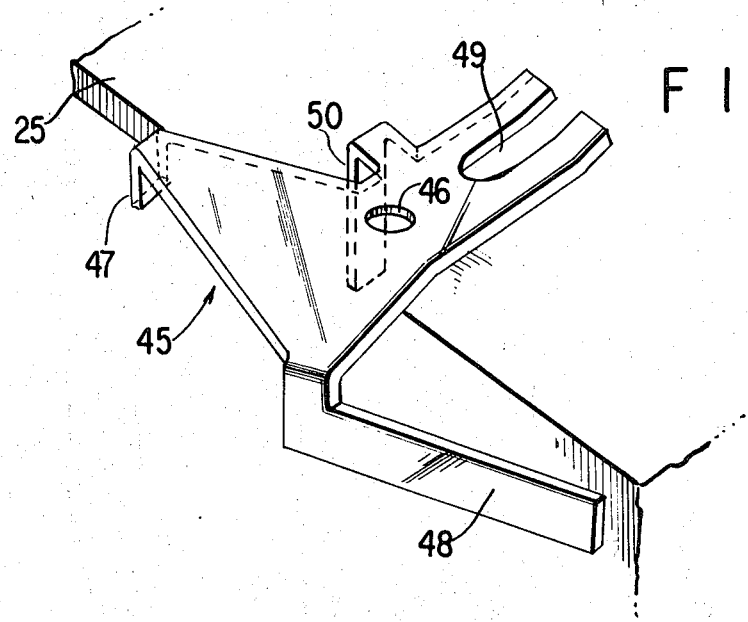
FIG. 5 is an overall perspective view of the spring plate shown in FIG. 3.

The pressure gauge according to the present invention is illustrated in FIGS. 1 and 2 and indicated generally at 10. The gauge comprises a casing 11 having a rear wall 12 and a side wall 13 with the front face thereof being open and enclosed by a transparent cover plate 14, which may be of plastic and has a flange 15 to snap into a peripheral groove 16 on the side wall of the casing. The side wall is provided with an opening 17 through which passes a socket 18 whose cross-section substantially conforms to the shape of opening 17. The lower end of the socket 18 is provided with external threads 19 for mounting of the gauge in a suitable threaded connection.

The socket 18 is provided with an internal bore which communicates with an end 20 of a Bourdon tube 21. The end 20 may be soldered into a notch cut into the socket and having the shape as shown in FIG. 1.

The other or free end of the Bourdon tube is indicated at 22 and is pivotally connected by means of a link 23 to an instrument movement indicated generally at 24.

The movement 24 comprises a top plate 25 which is pivotally mounted on the socket by a pivot pin connection 26. The top plate is also provided with a slot 27 extending substantially radially from the pivot connection.

Mounted to the top plate at a short distance therefrom is a bottom plate 29 secured to the top plate by interconnecting columns 30 and 31. A dial pointer shaft 32 is journalled between the top and bottom plates and is provided with a pinion gear 33 which meshes with a sector gear 34 pivotally connected at 35. The pointer shaft is provided with a spiral spring 36 to remove the backlash in the various movement components and linkages.

The sector gear is provided with a curved tail end 37 which is connected to the link 23.

In order to impart a pivotal movement to the top plate 25, and accordingly to the entire instrument movement about the pivot connection 26, a pin 38 is rotatably mounted within a bore 39 formed in the socket 18. Adjacent the outer end of pin 38 is an eccentric 40 which is received within the slot 27. The structure of the pin is clearly shown in FIG. 4. The outer end of the pin 38 extends outwardly through an opening in a dial face 41 of the instrument and is provided with a slot 42 into which a suitable tool may be inserted to rotate the pin. It is apparent that rotation of the pin will cause the eccentric 40 to engage the sides of the slot 27 and thereby rotate the top plate 25.

The pin 38 is provided with an annular groove 43 and a portion of the socket is staked at 44 to extend into the groove to retain the pin 38 in the bore.

Although not required, spring plate 45 (FIG. 5) may be mounted on the socket 18 by means of the pivot pin 26 passing through an opening 46. The spring plate is made of a suitable resilient sheet metal and has a tab 47 which bears against an edge of the top plate 25 and a resilient spring arm 48 which bears against the socket 18 as may be seen in FIGS. 3 and 5. The spring plate is also provided with a slot 49 to accommodate the eccentric pin 38 with the slot 49 substantially coinciding with slot 27 on the top plate 25. Use of the spring plate will remove any clearance between the slot 27 and the eccentric 40, thus improving the accuracy of the adjustment.

The spring plate is also provided with a resilient arm 50 which extends through opening 28 in the top plate so as to be interposed in the path of movement of the sector gear 34 in the manner as shown in FIG. 3. The arm 50 provides a retarding action of the instrument movement and may be used to extend the range of the graduated scale on the dial face. For example, since a greater force would have to be exerted by the Bourdon tube to cause the instrument movement to move against the retarding action of spring arm 50, it is apparent that an increment of movement of the pointer while influenced by the retarding arm will represent a somewhat greater pressure differential than on the previous portion of the graduated scale. The retarding arm 50 thus loads the Bourdon tube and slows the pointer motion over a predetermined portion of the graduated scale on the dial face. It is pointed out that the pressure gauge according to the present invention may be constructed without the use of this retarding arm.

The spring plate thus provides a dual function of biasing the top plate slot against the eccentric and of retarding the movement of the dial pointer.

The graduated csale indicating the pressure sensed by the gauge is indicated at 51 and is affixed to the outer face of dial face 41 which may be attached to the socket by means of pin 26. An indicator pointer 53 mounted upon the pointer shaft 32 moves over the graduated scale on the dial face.

When it is desired to adjust the pointer to zero or to calibrate the gauge, the transparent cover 14 is removed and a suitable tool inserted into the slot 42 of the adjustable pivot pin 38. As the pin 38 is rotated by the tool, the eccentric 40 will act against the top plate slot 27 to cause the pivot point 35 of the sector gear to move in the direction indicated by the double pointed arrow 54. The sector gear 34 will thus pivot about the pivot point 35 since the tail end 37 of the segment will be held stationary by the link 23 to the free end 22 of the Bourdon tube. As the sector gear rotates the pointer, shaft 32 will also rotate to result in a zero adjustment of the pointer.

The pivotal movement of top plate 26 will result in a movement of the pinion center along the direction of the double pointed arrow 55. This movement of the pinion is not desirable. The magnitude of its movement, however, is small, and the calibration errors resulting from it are acceptable for general purpose gauges. It would also be possible to pivot the bottom plate.

Figure 6:
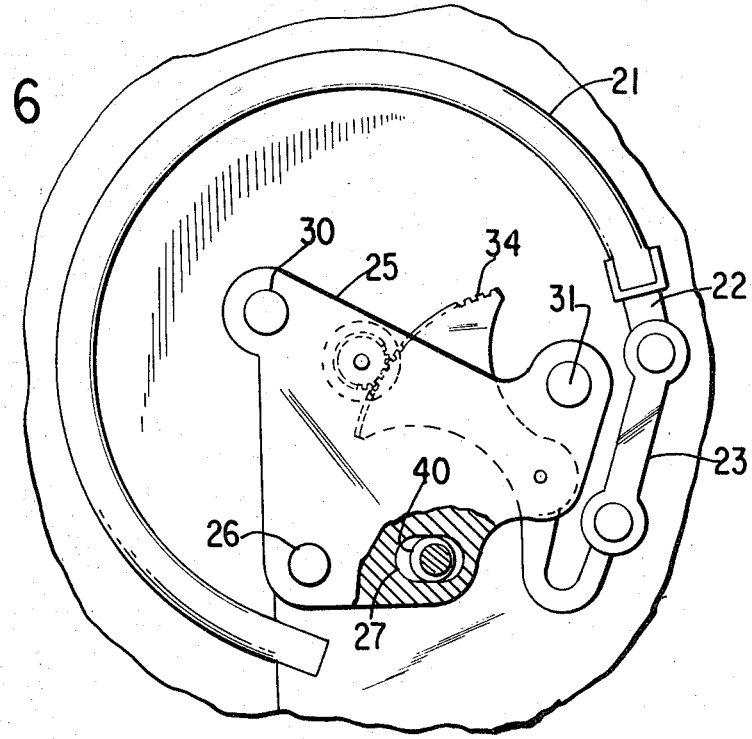
FIG. 6 is a front elevational view similar to that of FIG. 3 of a modification of the pressure gauge wherein the spring plate is omitted.

FIG. 6 illustrates an arrangement wherein the spring plate has been omitted, the other parts being given the same reference symbols.

It will be understood that various details of construction and arrangement of parts may be made without departing from the spirit of the invention.

What is claimed is:

1. In an instrument casing assembly for a pressure gauge, the combination of a socket for connection to a pressure source, a Bourdon tube having one end mounted on said socket for communication therewith and the other end being free, an instrument movement including a pointer shaft having an axis and a top plate, pivot means for said plate for pivotally mounting said plate on said socket, said pivot means being spaced from the axis of said pointer shaft [axis], [pivot means for said top plate for pivotally mounting] link means interconnecting said movement with the free end of said Bourdon tube so that the movement is actuated in response to movement of the tube, and means on said socket for pivoting said top plate and the movement therewith around the pivot connection between said plate and said socket while the Bourdon tube free end remains stationary whereby the pointer shaft is moved to adjust the pointer indication.

2. In an instrument casing assembly as claimed in claim 1 wherein said top plate has a slot extending radially from the pivot connection, and an eccentric rotatable in said slot to pivot the top plate.

3. In an instrument casing assembly as claimed in claim 2 and comprising a pin rotatably mounted in said socket, said eccentric being on said pin.

4. In an instrument casing assembly as claimed in claim 3 wherein one end of said pin is accessible externally of the socket.

5. In an instrument casing assembly as claimed in claim 4 with the external end of said pin being slotted for actuation by a suitable tool.

6. In an instrument casing assembly as claimed in claim 2 and comprising spring means mounted on said socket for biasing the top plate against the eccentric.

7. In an instrument casing assembly as claimed in claim 1 and comprising resilient means mounted on said socket and extending into the path of said movement so as to be engaged by a sector gear of the movement after the sector gear has passed through a predetermined distance whereby subsequent movement of the sector gear is retarded.

8. In an instrument casing assembly as claimed in claim 6 with said spring means having a resilient arm extending into the path of said movement so as to be engaged by the sector gear of the movement after the sector gear has passed through a predetermined distance whereby subsequent movement of the sector gear is retarded.

References Cited

UNITED STATES PATENTS

| 1,290,375 | 1/1919 | Shaw | 73—414 |
| 1,380,417 | 6/1921 | Roesch | 73—415X |
| 2,047,581 | 7/1936 | Grissett | 73—415 |
| 2,162,306 | 6/1939 | Hedfield | 73—415 |
| 2,227,514 | 1/1941 | Seegers | 73—415 |
| 2,344,882 | 3/1944 | Kahn | 73—415 |
| 2,514,745 | 7/1950 | Dalzell | 116—129(AX) |
| 3,369,410 | 2/1968 | Clayton, Jr. | 29—437X |

LOUIS R. PRINCE, Primary Examiner

D. M. YASICH, Assistant Examiner

U.S. Cl. X.R.

116—129

UNITED STATES PATENT OFFICE
CERTIFICATE OF CORRECTION

Patent No. 3,559,489            Dated February 2, 1971

Inventor(s) Ralph D. Waite and Thomas A. S. Duff

It is certified that error appears in the above-identified patent and that said Letters Patent are hereby corrected as shown below:

Column 1, line 4, "Amtek" should be --Ametek--; Column 3, l 41, "csale" should be --scale--; Column 3, line 55, "35" sh be --26--; Column 3, line 60, "26" should be --35--; Column lines 13 and 14, "[axis] [pivot means for said top plate fo pivotally mounting]" should be omitted.

Signed and sealed this 11th day of May 1971.

(SEAL)
Attest:

EDWARD M. FLETCHER, JR.          WILLIAM E. SCHUYLER, J1
Attesting Officer                Commissioner of Patent: